United States Patent [19]

Moser et al.

[11] Patent Number: 5,034,204

[45] Date of Patent: Jul. 23, 1991

[54] FLUE GAS DESULFURIZATION PROCESS

[75] Inventors: Robert E. Moser, Palo Alto, Calif.; John M. Burke, Austin, Tex.; David R. Owens, Lockport, N.Y.

[73] Assignee: Electric Power Research Institute, Palo Alto, Calif.

[21] Appl. No.: 454,855

[22] Filed: Dec. 22, 1989

[51] Int. Cl.$^5$ .................. C01B 17/00; B01D 8/00
[52] U.S. Cl. ..................... 423/243; 423/242
[58] Field of Search ............... 423/242 A, 242 R, 243, 423/244 A

[56] References Cited

U.S. PATENT DOCUMENTS

| | | | |
|---|---|---|---|
| 3,632,306 | 1/1972 | Villiers-Fisher et al. | 423/243 |
| 3,690,824 | 9/1972 | Gorin et al. | 423/243 |
| 3,843,771 | 10/1974 | Urban | 423/242 |
| 3,906,080 | 9/1975 | Gorin et al. | 423/242 |
| 3,928,537 | 12/1975 | Satoh et al. | 423/213 |
| 4,178,349 | 12/1979 | Wienert | 423/242 |
| 4,279,873 | 7/1981 | Felsvang et al. | 423/242 |
| 4,454,101 | 6/1984 | Garrison et al. | 423/242 |
| 4,615,871 | 10/1986 | Yoon | 423/243 |
| 4,670,236 | 6/1987 | Thomas et al. | 423/242 |
| 4,976,937 | 12/1990 | Lee et al. | 423/242 |

*Primary Examiner*—Gregory A. Heller
*Attorney, Agent, or Firm*—Sixbey, Friedman, Leedom & Ferguson

[57] ABSTRACT

A wet, calcium-based, flue gas desulfurization process for reliably and cost effectively removing sulfur dioxide from the flue gas generated by the combustion of fossil flues containing sulfur includes the step of contacting the combustion flue gas preferably as a part of the scrubbing liquor, with an aqueous solution containing formate ions and a dissolved calcium concentration reduction agent. The latter reduces the dissolved calcium concentration present in the flue gas which, in turn reduces the coprecipitation and loss of formate within and from the system. Also, by contacting the flue gas with an aqueous solution comprising formate and thiosulfate ions, the formate coprecipitation within the system is reduced independent of the calcium concentration level within the system.

9 Claims, 3 Drawing Sheets

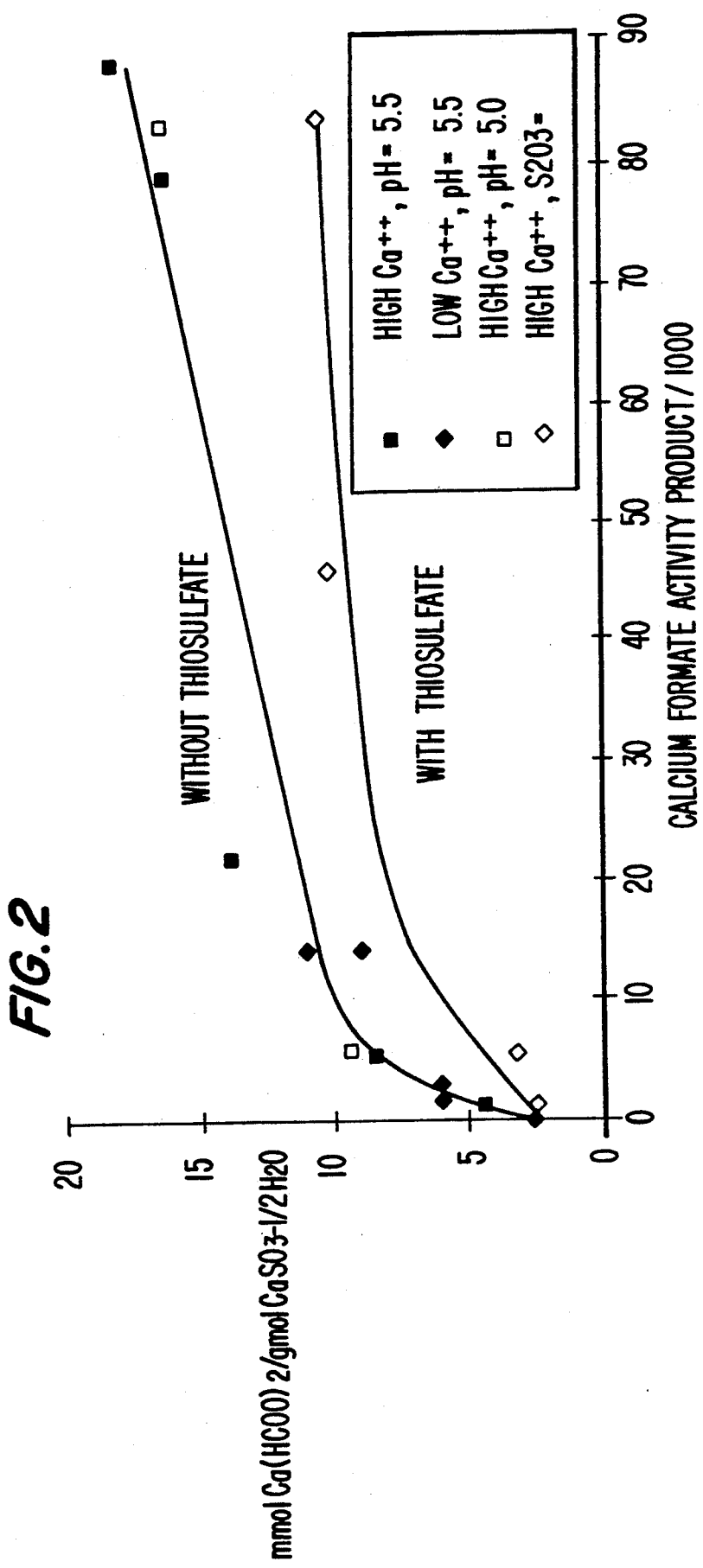

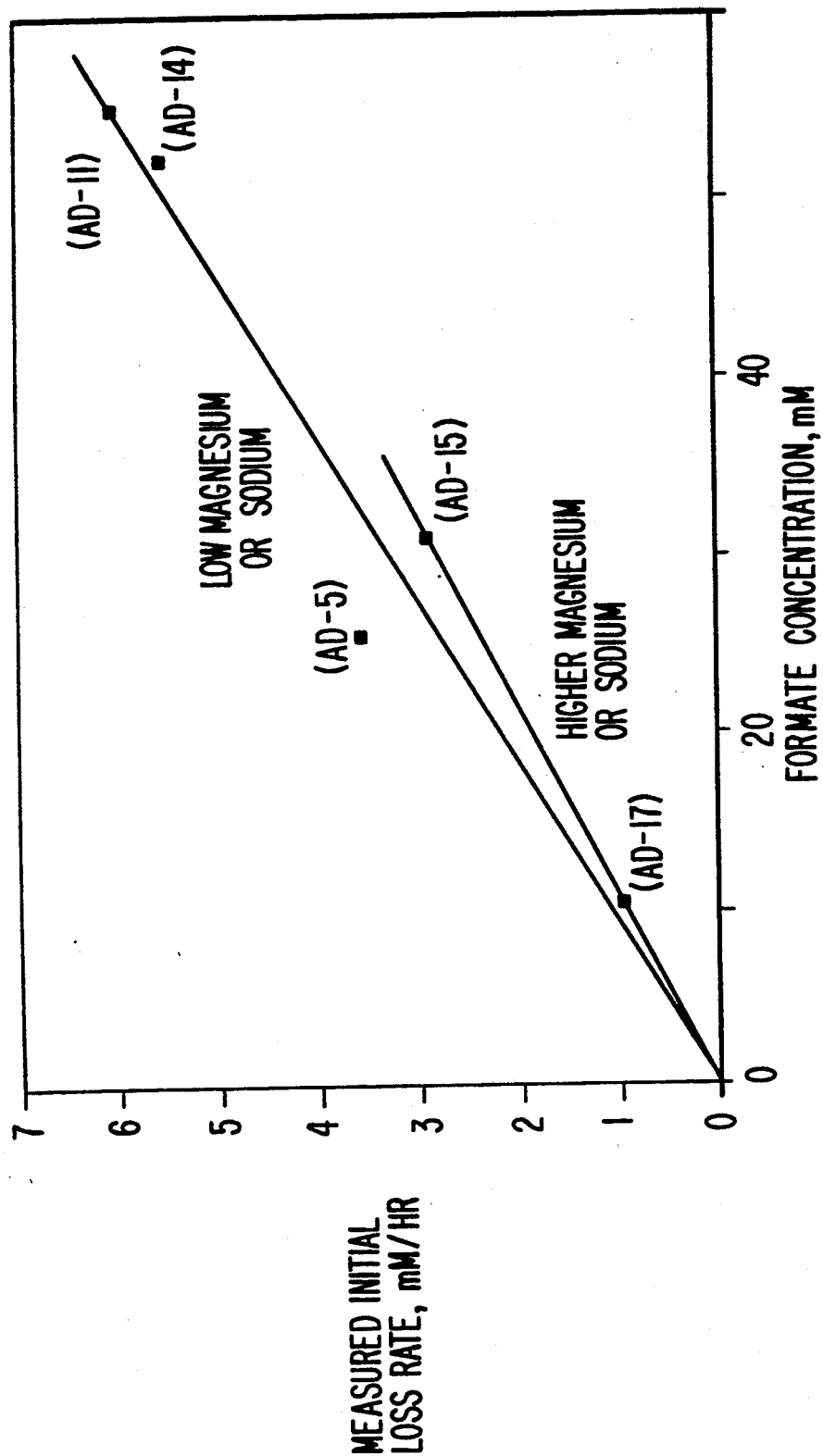

FLUE GAS DESULFURIZATION PROCESS

BACKGROUND OF THE INVENTION

1. Technical Field of the Invention

This invention relates to an improved process for reducing the sulfur content in flue gas generated by the combustion of a sulfur-containing fuel. More particularly, the present invention relates to the combined addition of formate and thiosulfate, magnesium, sodium or other calcium concentration reduction agent to improve the performance of and reduce costs in wet, calcium based flue gas desulfurization processes.

2. Description of the Prior Art

Over the past two decades, the consumption of electrical power generated by power generation sources which use sulfur-containing fuels, particularly coal for the generation of steam for producing such electrical power, has increased tremendously while the restrictions placed on the flue gases which emanate from the burning of such sulfur-containing fuels have been tightened nationwide and particularly in areas where a heavy concentration of such gases develop. Therefore, there have been a variety of systems developed for treating the flue gases which emanate from the power generation plant such that the stringent standards promulgated by the Environmental Protection Agency can be met.

These various systems include processes which attempt to reduce or eliminate the sulfur content in the fuel prior to its combustion. Other systems include processes which require the addition of chemical compounds into the combustion zone which change the nature of the sulfur compounds produced, thereby aiding in their removal from the combustion products. Still other systems include scrubbers which require the addition of compounds into the flue gas generated by the combustion of the sulfur-containing fuels to remove the sulfur compounds from the flue gas by way of a chemical reaction.

The after treatment of flue gas may be accomplished by a variety of known processes; namely, wet scrubbing, spray drying or dry treatment of the flue gas in a contact zone of a flue gas flow passage. Illustrative of the wet scrubber approach is U.S. Pat. No. 3,928,537, issued Dec. 23, 1975 to Saitoh et al., which discloses contacting the exhaust gas with an aqueous solution of an organic acid to form a soluble sulfite or sulfate. The sulfite or sulfate is removed, and the organic acid regenerated, by a second step comprising reaction with a calcium compound such as an inorganic or an organic acid salt, for example calcium hydroxide or calcium formate.

The spray dryer approach is illustrated for example by U.S. Pat. No. 4,279,873, issued July 21, 1981 to Felsvang et al., which discloses spraying a suspension of fresh slaked lime and recycled fly ash plus spent calcium compound into the hot flue gas in such a manner as to evaporate the slurry droplets to dryness; the resulting powdered solids are removed from the flue gas by a downstream electrostatic precipitator or bag filter.

U.S. Pat. No. 4,178,349, issued Dec. 11, 1979 to Wienert illustrates the dry treatment; it discloses mixing a dry, powdered lime-bearing material in a reactor, and subsequently separating the solids from the treated flue gas.

Another example of a dry process is the flue gas desulfurization process set forth in U.S. Pat. No. 4,615,871 issued to Yoon which utilizes calcium formate to remove sulfur compounds from combustion exhaust gas in a dry treatment system. In doing so, a finely divided dry solid is formed and subsequently separated from the flue gas. However, systems employing dry injection FGD processes differ from that of wet calcium-based FGD processes in that it is necessary to control the humidity of the flue gas and consequently requires that the environment within the contact zone of the flue gas passage be maintained at a particular optimum level which is both costly and difficult to accomplish. Many additives have been proposed for improving the performance of various aspects of wet calcium based gas desulfurization (FGD) processes. For example, U.S. Pat. No. 4,670,236 issued to Thomas et al. introduces a 50:50 diisobutylene-maleic anhydride copolymer having an average molecular weight of 11,000, However, the introduction of diisobutylenemaleic anhydride does nothing to enhance the desulfurization of the flue gasses and only reduces the formation of calcium scale on the surfaces of the system to reduce maintenance costs.

In U.S Pat. No. 4,454,101 issued to Garrison et al., relatively small amounts of a sodium thiosulfate additive or additives derived from or related to sodium thiosulfate are added into the scrubber liquid slurry. As a result, the thiosulfate ion alters the conglomerative characteristics of the spent slurry crystals making them settle from suspension faster and dewater more readily when filtered. However, the Garrison et al. process is not intended to improve the desulfurization process. Rather, it operates only to improve the dewatering capabilities of sulfite sludges from flue gas desulfurization facilities.

Clearly, there is a pressing need for a flue gas desulfurization process which will improve the efficiency and cost effectiveness of wet, calcium-based FGD systems by reducing the sulfur dioxide content of flue gases being discharged into the atmosphere while minimizing the downtime and replacement costs necessitated by the formation of calcium scale within the system. Also, with the cost of chemical additives increasing, there is a need for a system which will effectively reduce the sulfur dioxide level of the flue gas while consuming a minimal amount of reactive chemical. Further, with the more stringent environmental restrictions which have been implemented by the Environmental Protection Agency, there is a need for a cost-effective and reliable wet, calcium-based flue gas desulfurization process which is capable of meeting current environmental standards.

SUMMARY OF THE INVENTION

Therefore, it is an object of the present invention to overcome the shortcomings associated with those prior processes discussed above and to provide an improved, more reliable and cost efficient wet, calcium-based flue gas desulfurization process wherein the loss of formate in the form of precipitated solids from the system is reduced while also eliminating the potential for the formation of gypsum scale.

Another object of the present invention is to provide a wet, calcium-based FGD process to which there is added an additive comprising formate ions and a dissolved calcium concentration reduction agent.

Still another object of the present invention is to provide a flue gas desulfurization process which includes the addition of formate ions to the flue gas which minimizes the quantity of formate which must be added to the system to maintain an optimal formate concentration.

These, as well as other advantages of the present invention, are achieved by providing a flue gas desulfurization process including the step of adding to the flue gas an additive comprising formate ions and an agent which reduces the dissolved calcium concentration therein. Such an agent may include, but is not limited to, the soluble compounds of thiosulfate, magnesium, sodium and ammonium. In a preferred embodiment of the present invention, the additive comprises formate ions and thiosulfate ions. It has been found that each of these ions enhance the performance of the other, resulting in a reduction in the dissolved calcium concentration and consequently a reduction in formate coprecipitation. Moreover, it has been found that with the addition of thiosulfate, the coprecipitation of formate is reduced independent of the calcium concentration.

Further objects of the subject invention will become apparent from the following description of the preferred embodiments.

BRIEF DESCRIPTION OF THE DRAWINGS

FIG. 2 is a graphical illustration comparing formate coprecipitation as a function of formate activity product with the addition of thiosulfate vs. without the addition of thiosulfate.

FIG. 3 is a graphical illustration of the relationship between formate concentration and the loss rate of formate in a wet, calcium-based flue gas desulfurization process for systems which include the addition of magnesium and systems which do not include the addition of magnesium.

DETAILED DESCRIPTION OF THE PREFERRED EMBODIMENT

Figure 1:
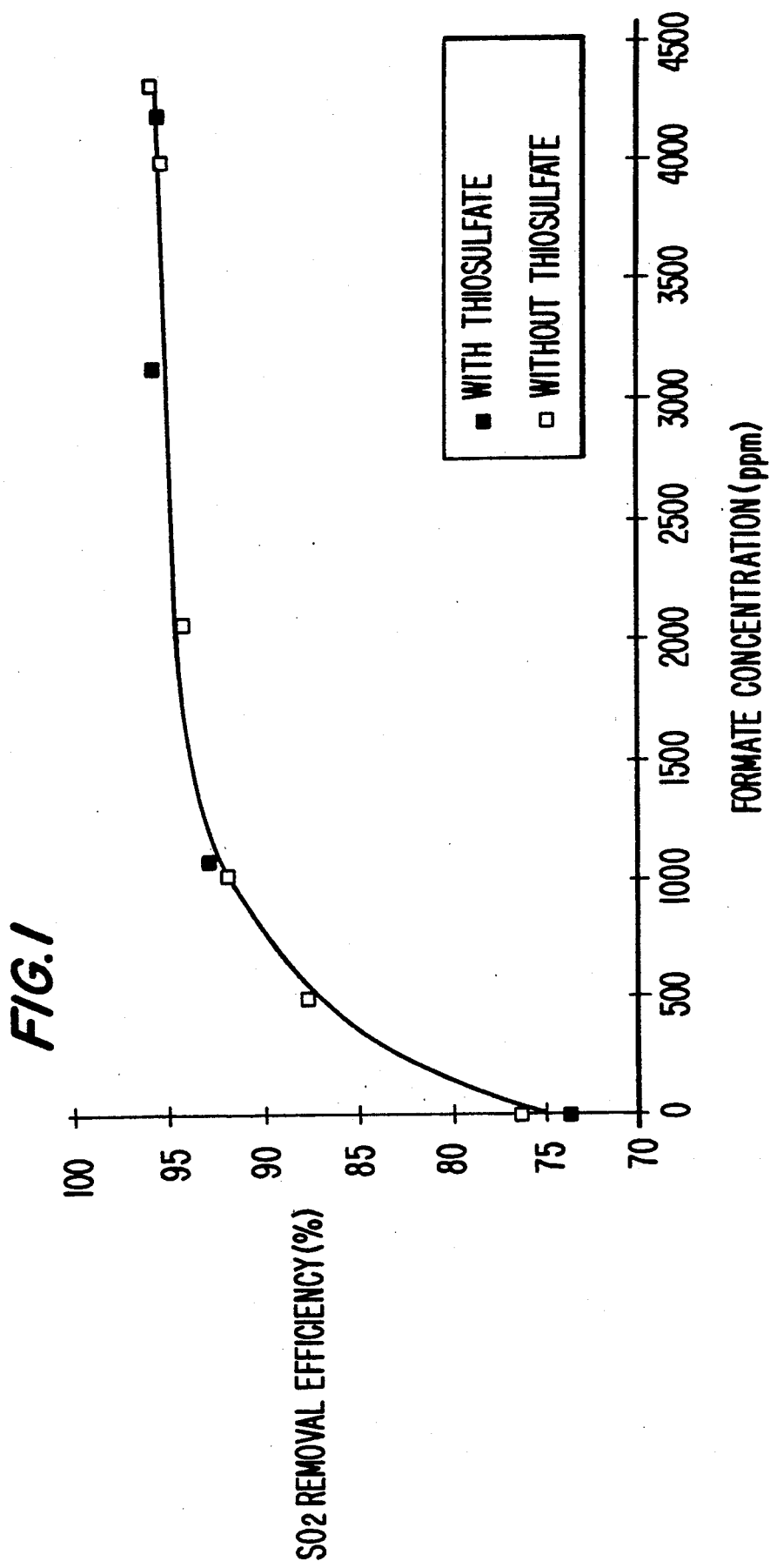
FIG. 1 is a graphical illustration of the effect of the addition of both formate and thiosulfate on sulfur dioxide removal in wet, calcium-based flue gas desulfurization processes in accordance with the present invention

A common by-product of electrical power generating plants which burn fossil fuels such as coal is a flue gas which contains dangerous amounts of sulfur dioxide. Inasmuch as environmental regulations restrict the discharge of the sulfur dioxide into the atmosphere, the flue gas must be treated to remove sulfur dioxide and other environmental contaminants. Most typically, the flue gas is directed from the combustion chamber where the burning occurs through heat recovery exchangers into the treatment zone and, following flue gas clean-up, by way of duct work to a stack where the cleaned flue gas is expelled into the atmosphere. Because this flue gas includes solid particles in the form of fly ash, the flue gas is initially treated for solids removal in any of several well known manners. This initial treatment removes only the solid particles and, consequently, the flue gas containing sulfur dioxide is unaffected thereby. It is the subsequent process for the removal of sulfur dioxide from the flue gas which constitutes the essence of the present invention.

In accordance with the present invention, sulfur dioxide removal is accomplished in a wet, calcium-based flue gas desulfurization (FGD) process wherein a sulfur dioxide-containing flue gas is passed in contact with an aqueous calcium-bearing (e.g., calcium oxide or carbonate) scrubbing liquor whereby the sulfur dioxide is removed from the flue gas by being absorbed by the scrubbing liquor. An aqueous reagent slurry is sprayed into contact with the flue gas, for example by admixture with the liquor at a point downstream from the point at which the solid separation takes place and upstream of the flue gas discharge to the atmosphere. The solution useful in the present invention comprises both the formate ion (HCOO$^-$ which can be added as formic acid or a soluble salt of formic acid) and an ion of a dissolved calcium concentration reduction compound, such as thiosulfate ion ($S_2O_3^=$ added as a soluble salt of thiosulfate or formed insitu through the addition of elemental sulfur), magnesium ion, sodium ion, ammonium ion, or any other ionic agent which can be used to reduce the dissolved calcium concentration in a wet, calcium-based FGD system. Use of solutions such as are described hereinabove enhances, both the resultant performance and reliability of the flue gas desulfurization process and significantly reduces the cost of the process by virtue of minimizing the amount of formate added to the system. This is accomplished by reducing the dissolved calcium concentration which, in turn, reduces the calcium ion activity, reducing the calcium formate activity product and the corresponding rate of formate coprecipitation. Also, with the use of formate and thiosulfate, the formate coprecipitation is reduced independently of the calcium concentration as will be described in greater detail below. Inasmuch as the coprecipitation of calcium formate within the calcium sulfite crystal represents 70 to 90% of the nonsolution losses of formate from the system, it can be seen that reduction of dissolved calcium concentration is a key element in conserving formate within the system.

Many additives have been proposed for improving the performance and/or reliability of wet, calcium based Flue Gas Desulfurization processes. However, as can be seen from the foregoing discussions, few of these additives have been considered for use in combination with one another. Moreover, the combination of additives in some instances may be detrimental to the performance and reliability of the wet, calcium-based flue gas desulfurization processes. As will be described in greater detail hereinbelow, the combination of particular additives herein-described have been found to both improve the performance of flue gas desulfurization processes as well as improve the reliability and economics of such processes while eliminating the potential for gypsum scaling for providing a substantially maintenance-free environment within the flue gas flow passages.

It has been found that the use of sodium formate in combination with thiosulfate, magnesium, sodium, ammonium or any other additive which can be used to reduce the dissolved calcium concentration in a wet, calcium-based FGD system has proven to be more cost effective than using sodium formate alone. This is because the combination of sodium formate with these and other dissolved calcium concentration reducing agents has resulted in a significant reduction in the loss of sodium formate from the system due to coprecipitation of the compound. This discovery of the source of formate loss in FGD processes has resulted in the development of a process which, as described above, improves the performance, reliability and cost effectiveness of such processes.

Sodium formate acts to buffer the pH in the FGD process in a range which promotes increased sulfur dioxide removal. At the same time, the additive which reduces the dissolved calcium concentration increases the solubility of the sulfite ion which also acts as a buffer. In the preferred embodiment, the additive comprises thiosulfate or emulsified elemental sulfur which will produce thiosulfate ions when added to wet, calcium-based FGD systems. In the presence of thiosulfate, the oxidation of sulfite ions to sulfate ions is inhibited. If the sulfite oxidation fraction can be reduced to less than 15 percent, it has been shown that the wet, calcium-based FGD system can be operated at a subsaturated level with respect to the formation of calcium sulfate dihydrate (gypsum scale). Operation of the FGD process in this manner eliminates the potential for the deposition of gypsum scale within the flue gas passages, a problem which often requires the system to be shut down for maintenance purposes and significantly affects the reliability of the FGD system. Further, with the sulfite oxidation fraction reduced to a level below 15 percent, the dissolved calcium concentration is also reduced. For systems with low dissolved chloride concentrations, the reduction in calcium concentration which occurs when sulfite oxidation is reduced represents a substantial reduction in the total dissolved calcium concentration. As will be seen more clearly hereinafter, this, in turn, aids in the performance and reliability of the FGD process.

The most significant formate loss mechanism naturally oxidized, in wet, calcium-based FGD systems is the coprecipitation of calcium formate within the calcium sulfite crystal. It has been found that this loss represents between 70 and 90 percent of the nonsolution losses of formate from the system. The rate of formate coprecipitation is dependent on the calcium sulfite precipitation rate and on the activity product of calcium formate in the system. This activity product may be calculated as follows:

$$Ca(HCOO)_2 \text{ activity} \\ \text{product} = (a_{Ca^{++}}) \times (a_{HCOO^-})^2$$

where the $a_{Ca^{++}}$ is the activity of the calcium ion in the solution and $a_{HCOO^-}$ represents the activity of the formate ion. This activity of the calcium ion is calculated directly using an FGD liquid phase equilibrium computer model and the activity of the formate ion is estimated from the product of the formate ion concentration and the chloride ion activity coefficient which is also calculated using the aforementioned computer model. The chloride activity coefficient is used to determine the activity of the formate ion because the computer model does not currently include formate ions and the chloride activity coefficient is directly proportionate thereto.

With reference now to FIG. 1, it can be noted that the introduction of thiosulfate into the FGD process does not adversely affect the sulfur dioxide removal efficiency and in actuality enhances this removal process. This desired result will be discussed in greater detail with reference to the examples which follow.

As can be seen from FIG. 2, the calcium formate coprecipitation rate per mole of calcium sulfite precipitated can change by a factor of five or more depending solely on the calcium formate activity product. This is illustrated by the upper curve of FIG. 2. Therefore, by reducing the calcium concentration and thus the calcium activity, the formate consumption rate can be reduced substantially. It should be noted from FIG. 2 that there is a significant reduction in formate coprecipitation with the use of thiosulfate. This may be due to the selective coprecipitation of calcium thiosulfate rather than calcium formate in the calcium sulfite crystal lattice, or perhaps a change in the morphology of the sulfite crystal in the presence of thiosulfate. Whichever scenario may apply, the resultant effect is significant and the loss of formate from the wet, calcium-based FGD system is reduced. It should be noted that the tests represented by FIG. 2 were carried out under constant calcium concentration levels.

Significant benefits have been realized with the use of these additives in combination with one another. The addition of sulfur to a system already using formate in a wet, calcium-based flue gas desulfurization process can significantly reduce the quantity of formate which must be added to the system to maintain an optimal formate concentration level. This is brought about by the formation of thiosulfate which reduces the oxidation of sulfite ions to sulfate ions which in turn reduces the dissolved calcium concentration. Consequently, because it is the dissolved calcium concentration which reduces the formate concentration, a reduction of the dissolved calcium concentration in turn reduces the rate of formate loss from the system. Moreover, it has been found that through the use of formate and thiosulfate, formate coprecipitation is reduced independent of the calcium concentration level.

As discussed previously, it is possible to reduce the calcium concentration in a wet, calcium-based FGD system by the use of additives which reduce such calcium concentration. These additives may include but are not limited to thiosulfate, magnesium, sodium or ammonium ions and may include such other ions as have been proven to reduce the calcium concentration in FGD processes. Their effect is to significantly reduce the formate coprecipitation rate when applied. In order that those skilled in the art to which the present invention pertains may better understand the present invention, it will now be particularly illustrated by the following examples which are shown only by way of illustration and are not to be limiting of the present invention.

EXAMPLE I

A conventional wet, calcium-based flue gas desulfurization process was run initially under baseline conditions; i.e., without additives. It can be noted from Table I that a baseline or constant run was performed to illustrate the significance of the addition of formate to the system. With the addition of Formate-01 (formate only), a significant increase in SO$_2$ removal is experienced (90%); however, the non-solution losses of formate in this system is also significant (1104 meq/hr). With the additive of Formate-02 (formate plus thiosulfate), the SO$_2$ removal rate was slightly enhanced while the formate non-solution loss amount dropped over 50% to 525 meq/hr. Therefore, by the addition of thiosulfate to a wet, calcium-based FGD process which utilizes formate for SO$_2$ removal, the consumption of formate can be significantly reduced.

TABLE I

| FORMATE/THIOSULFATE TEST RESULTS SUMMARY | | | |
|---|---|---|---|
| TEST ID | Baseline | Formate-01 | Formate-02 |
| Formate (ppm) | 0 | 1785 | 1849 |
| Thiosulfate (ppm) | 0 | 0 | 1376 |
| SO$_2$ Removal (%) | 74 | 90 | 91 |
| Utilization (%) | 94 | 98 | 99 |
| Oxidation (%) | 24 | 8 | 6 |

TABLE I-continued

| FORMATE/THIOSULFATE TEST RESULTS SUMMARY | | | |
|---|---|---|---|
| TEST ID | Baseline | Formate-01 | Formate-02 |
| Waste Solids (%) | 55 | 55 | 70 |
| Non-Solution Loss (meq/hr) | — | 1104 | 525 |

EXAMPLE II

As with the previous example, a conventional wet, calcium-based flue gas desulfurization process was run initially under baseline conditions (Test AD-1) as shown in Table II. Next, the system was run with the addition of formate, resulting in a substantial increase in the removal of $SO_2$ (Test AD-5). The system was also run with the addition of 500 ppm of thiosulfate (Test AD-11) which evidenced results similar to that discussed above. Subsequently, 1962 ppm of magnesium and sodium were added (Tests AD-15a and AD-15b) resulting in a significant decrease in the calcium concentration while increasing the $SO_2$ removal. Also tested was the addition of both thiosulfate and Magnesium (Test AD-17) the results of which are consistent with those previously discussed.

TABLE II

| FORMATE/THIOSULFATE, FORMATE/MAGNESIUM TEST RESULTS SUMMARY | | | | | | | | | | |
|---|---|---|---|---|---|---|---|---|---|---|
| Test | Description | pH | $SO_2$ Rem. Eff. % | Limestone Loading, g/l | Solids Ox. % | Gypsum R.S. | $CaSO_3$ R.S. | Ca++ mM | $SO_3=$. mM | $SO_4=$. mM |
| AD-1 | Baseline | 5.7 | 77.0 | 5.5 | 27 | 0.66 | 3.03 | 25.5 | 6.6 | 38.2 |
| AD-5 | 30 mM Formate | 5.7 | 87.7 | 6.0 | 13 | 0.44 | 2.18 | 14.0 | 8.0 | 43.6 |
| AD-11 | 60 mM Formate 500 ppm Thio | 5.7 | 90.5 | 4.1 | 8 | 0.14 | 2.00 | 6.2 | 16.6 | 35.3 |
| AD-15a | 30 mM Formate 1962 ppm Added Mg and Na | 5.7 | 91.0 | 4.4 | 8 | 0.19 | 1.86 | 5.2 | 26.2 | 85.7 |
| AD-15b | 30 mM Formate 1962 ppm Added Mg and Na | 6.0 | 93.5 | 14.0 | 9 | 0.13 | 1.87 | 3.7 | 23.7 | 81.5 |
| AD-17 | 12 mM Formate 1000 ppm Thio 1510 ppm Added Mg and Na | 5.7 | 92.5 | 6.0 | 7 | 0.08 | 1.97 | 3.0 | 51.0 | 60.9 |

As can be seen from FIG. 3, which is a graphical representation of formate loss rate as a function of formate concentration for various dissolved calcium concentration reduced agents, when read in conjunction with Table II, as the calcium concentration decreased, the loss rate of formate is reduced, resulting in a reduction in formate loss and, thus, in operating costs. It should be noted from the above examples that the reduction in formate loss is greater with the use of thiosulfate; however, any calcium reducing additive will reduce the formate loss to an appreciable degree.

The particular amounts of formate and the calcium concentration reduction agent will be directly dependent upon the type of system, the environmental restrictions which are in effect in the operating area as well as the operating parameters of the system and the environmental effects on the system. These values need be determined on an application-by-application basis and will be readily ascertainable by one skilled in the art.

Various additional calcium reducing additives may be used in addition to those mentioned above and will become apparent to those skilled in the art. Accordingly, the foregoing detailed description of the invention and examples are considered exemplary in nature, and it should be appreciated by those skilled otherwise than as specifically described herein without departing from the spirit and scope of the invention. It is, therefore, to be understood that the spirit and scope of the present invention be limited only by the appended claims.

What is claimed is:

1. In a flue gas desulfurization process in which sulfur-dioxide containing flue gas previously treated for solids removal is passed in contact with an aqueous scrubbing liquor which includes a percentage calcium whereby the sulfur dioxide is removed as a precipitate from said flue gas by being absorbed by said liquor, the improvement comprising an addition to said scrubbing liquor of both formate ions and a reduction agent which is soluble in said liquor and which reduces the percentage calcium of said liquor wherein said reduction agent is emulsified elemental sulfur which yields thiosulfate ions after said addition and wherein 100-10,000 ppm of said formate ion and 100-3,000 ppm of said emulsified elemental sulfur are present in said addition.

2. The process as claimed in claim 1, wherein said addition is admixed with said liquor for contacting said flue gas therewith.

3. The process as claimed in claim 2, wherein said reduction agent is selected from the group consisting of soluble compounds yielding, in contact with said gas and said liquor, ions of magnesium, sodium and ammonium.

4. The process as claimed in claim 2, wherein said reduction agent is a soluble compound yielding thiosulfate ions.

5. The process as claimed in claim 4, wherein a sufficient amount of thiosulfate is present in said liquor to inhibit the oxidation of sulfite ion to sulfate ion and to establish a sulfite oxidation fraction of less than 15%.

6. The process as claimed in claim 4, wherein sodium formate is the source of said formate ions 7. In a flue gas desulfurization process in which sulfur-dioxide containing flue gas previous treated for solids removal is passed in contact with an aqueous scrubbing liquor which includes a percentage of calcium whereby the sulfur dioxide is removed as a precipitate from said flue gas by being absorbed by said liquor, the improvement comprising an addition of both formate ions and a soluble reduction compound including emulsified sulfur which yields thiosulfate ions after said addition wherein 100-10,000 ppm of said formate ions and 100-3,000 ppm of said reduction agent are present in said addition for reducing the amount of said formate ions in said precipitate.

8. The process as claimed in claim 7, wherein a sufficient amount of thiosulfate is present in said liquor to inhibit the oxidation of sulfite ion to sulfate ion and to establish a sulfite oxidation fraction of less than 15%.

9. The process as claimed in claim 7, wherein sodium formate is the source of said formate ions.

* * * * *